United States Patent [19]

Beneck et al.

[11] Patent Number: 5,227,125
[45] Date of Patent: Jul. 13, 1993

[54] TOOL FOR HANDLING A CLUSTER OF RODS OF CONSUMABLE POISON

[75] Inventors: Jean Beneck, Ormesson; Bernard Morez, Acheres, both of France

[73] Assignee: Framatome, Courbevoie, France

[21] Appl. No.: 865,277

[22] Filed: Apr. 8, 1992

[30] Foreign Application Priority Data

Apr. 8, 1991 [FR] France .................. 91 04258

[51] Int. Cl.⁵ .......................................... G21C 19/105
[52] U.S. Cl. ..................................... 376/260; 376/262
[58] Field of Search .............. 376/260, 261, 262, 264, 376/268, 271; 294/906

[56] References Cited

U.S. PATENT DOCUMENTS

| | | | |
|---|---|---|---|
| 3,937,332 | 2/1976 | Flessner et al. | 376/262 |
| 3,990,591 | 11/1976 | Street et al. | 376/262 |
| 4,797,248 | 1/1989 | Tsitsichvili | 376/261 |
| 4,981,640 | 1/1991 | Beneck et al. | 376/261 |

FOREIGN PATENT DOCUMENTS

| | | |
|---|---|---|
| 1342267 | 12/1963 | France . |
| 1482974 | 6/1967 | France . |
| 2163678 | 7/1973 | France . |
| 2262376 | 9/1975 | France . |
| 2591021 | 6/1987 | France . |

*Primary Examiner*—Daniel D. Wasil
*Attorney, Agent, or Firm*—Pollock, Vande Sande & Priddy

[57] ABSTRACT

The tool comprises a head (1) for gripping the cluster (2), connected to a handling member (3) slidable in a tool body (4) between an active position in which the head (1) and at least part of the member (3) project from the body (4), and a retracted position in which the head (1), the handling member (3) and at least part of the cluster (2) extend within the body, and combs (5 to 10) for guiding the rods, at an end of the body (4) and displaceable between a retracted position in which they extend along the body (4), and an active position in which they extend perpendicularly to the body, in order to guide the rods. The tool also comprises springs (13) for stressing the combs into the active position and a sleeve (15) for retracting the combs, displaceable between retraction and release positions of the combs, by the head (1) and/or the handling member (3) during their displacement between their active and retracted positions within the body (4).

9 Claims, 3 Drawing Sheets

TOOL FOR HANDLING A CLUSTER OF RODS OF CONSUMABLE POISON

FIELD OF THE INVENTION

The present invention relates to a tool for handling a cluster of rods of consumable poison, used particularly in a fuel building of a nuclear power station, for example of the PWR type, in order to carry out handling operations on clusters of rods of consumable poison.

The tool is used especially during the first refuelling of the nuclear reactor and makes it possible to extract under water the clusters of rods of consumable poison inserted in the fuel assemblies or into cells of spent-fuel storage racks equipped with adaptors.

The tool is attached to a winch of a platform displaceable in the fuel building and comprises a head for gripping the cluster, connected to the end of a handling member displaceable slidably in a tool body between an active position, in which the head and at least part of the member project from the body in order to grip the cluster, and a retracted position, in which the member, the gripping head and part of the cluster extend within the body for the displacement of the cluster.

Moreover, the tool comprises combs for guiding the rods, provided at the corresponding end of the body and displaceable by raising between a retracted position, in which they extend substantially along the wall of the body, and an active position, in which they extend substantially perpendicularly to the wall in order to guide the rods when these extend at least partially within the body.

BACKGROUND OF THE INVENTION

In the prior art, the displacement of these combs between the retracted and active positions is effected by means of an operating linkage actuable, for example, by a user.

However, such a linkage has a relatively complex structure, its bulky and risks jamming of the combs.

SUMMARY OF THE INVENTION

The object of the invention is to solve these problems by providing a handling tool of simple structure and reduced bulk in which the displacement of the combs between the active and retracted positions is carried out in a highly reliable way and without the risk of jamming.

To this end, the subject of the invention is a handling tool of the type described above, comprising elastic means for stressing the combs into the active position and means for retracting the combs counter to the stress of the elastic means, displaceable between an active position of retraction of the combs and a retracted position of release of the combs by the gripping head and/or the handling member during their displacement between their active position and their position retracted within the body.

BRIEF DESCRIPTION OF THE DRAWINGS

The invention will be better understood from the following description given by way of example and with reference to the accompanying drawings) in which.

DESCRIPTION OF PREFERRED EMBODIMENTS

As mentioned above, the tool according to the invention for handling a cluster of rods of consumable poison is used particularly during the first refuelling of the nuclear reactor of a power station.

The tool is attached, for example, to the winch of a platform by means of a sling and is positioned above a fuel assembly comprising a cluster of rods of consumable poison. The assembly is stored, for example, in a spent-fuel storage rack.

The tool is placed onto the head of the fuel assembly by means of the winch of the platform, thereby making it possible in this position to extract the cluster.

Figure 1:
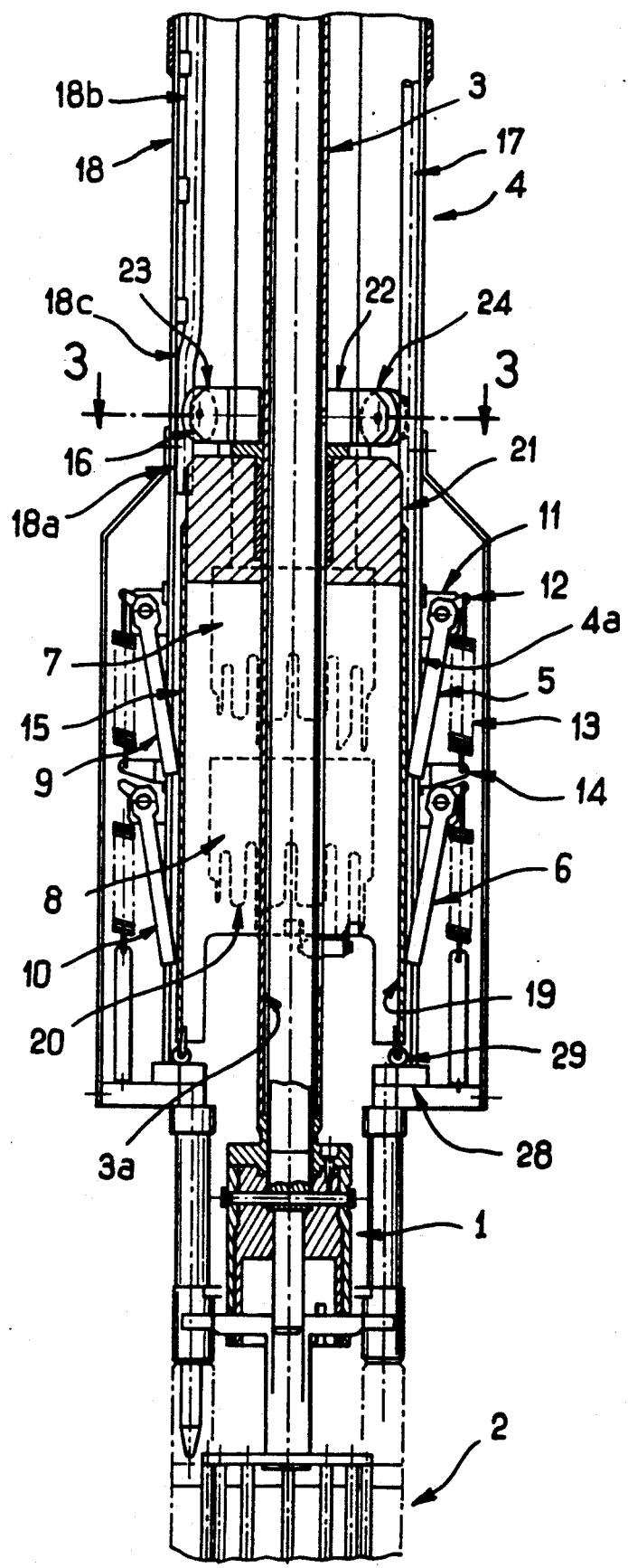
FIG. 1 is a sectional view of part of a handling tool according to the invention, in which the combs are illustrated in retracted position.
Figure 2:
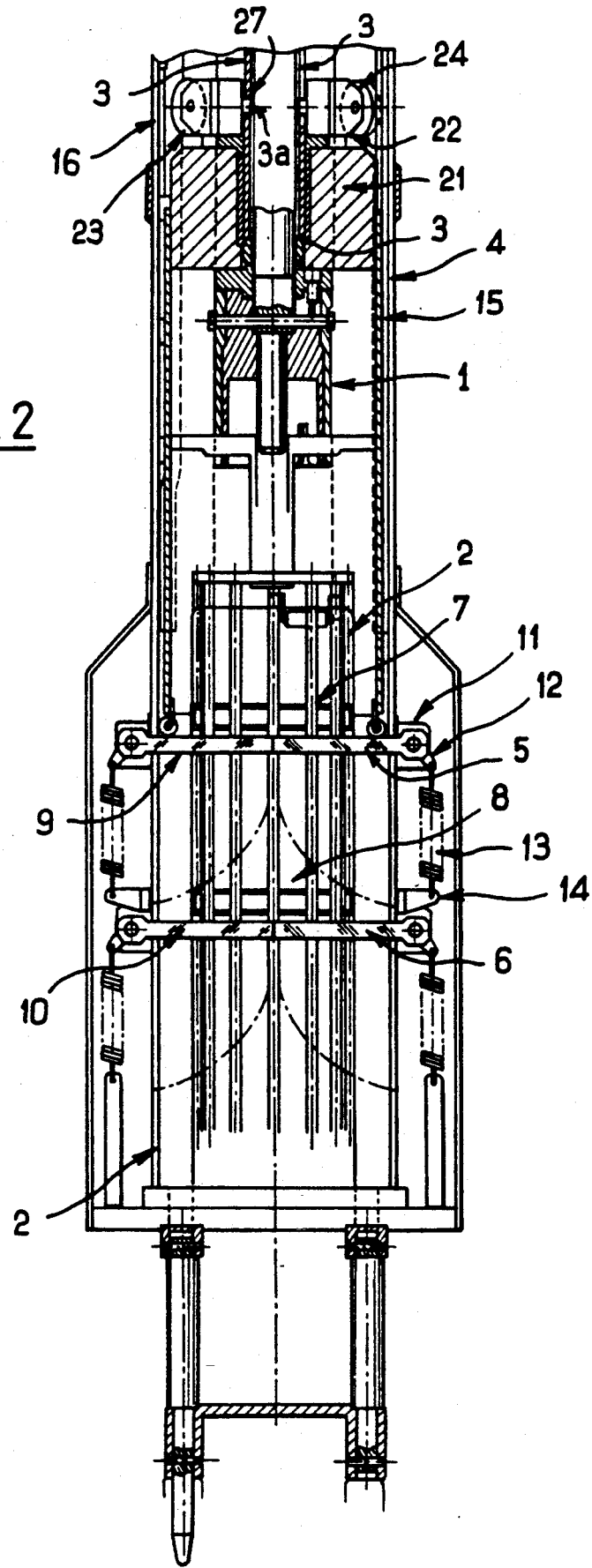
FIG. 2 is a sectional view of part of a handling tool according to the invention, in which the combs are illustrated in active position.
Figure 3:
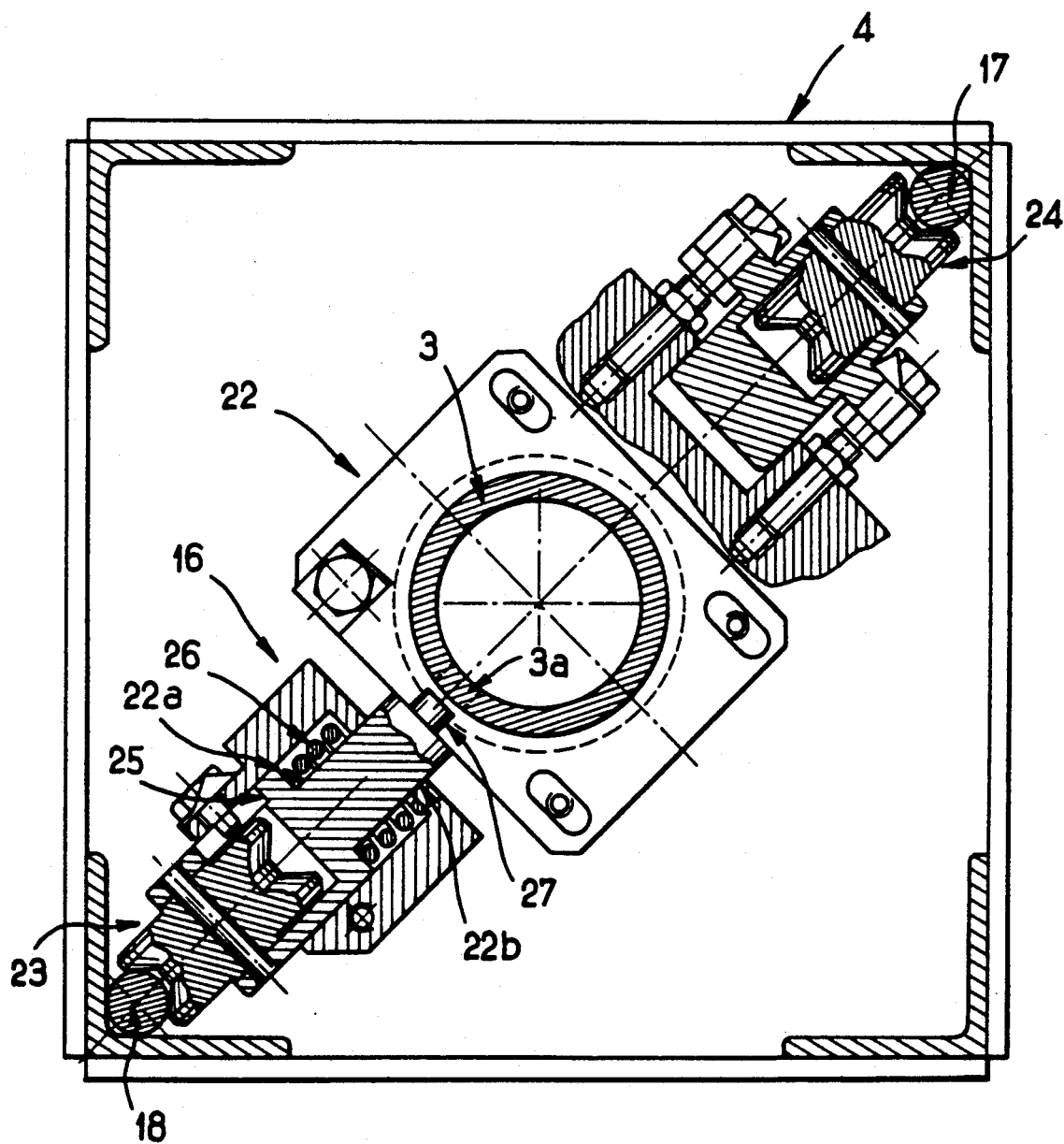
FIG. 3 is a top plan view, partly in section, taken along line 3—3 of FIG. 1.

As can be seen in FIGS. 1 to 3, the handling tool according to the invention comprises conventional head 1 for gripping the cluster 2 of rods of consumable poison. This gripping head has a conventional structure and is connected to one end of a handling member 3, the other end of which is connected to any conventional operating means. The handling member 3 is mounted so as to be displaceable slidably in a tool body 4 between an active position, shown in FIG. 1, in which the gripping head 1 and at least part of the handling member 3 project from the tool body 4 in order to grip the cluster, and a retracted position, shown in FIG. 2, in which the handling member, the gripping head and at least part of the rods of the cluster extend within the body 4 for the displacement of the cluster.

The tool body 4 is advantageously of square cross-section.

The tool also comprises, at its lower end, combs for guiding the poison rods.

These combs are, for example, arranged two by two one above the other on each face of the tool body, i.e. at 90° relative to one another. The combs are designated respectively by 5, 6, 7, 8, 9 and 10.

Since the form of these combs is conventional, it will not be described in more detail.

It will be noted, however, that the combs are articulated at one of their ends on supporting fittings fastened to the body and are mounted displaceably between a retracted position, shown in FIG. 1, in which the combs extend substantially along the wall of the body 4, and an active position, shown in FIG. 2, in which the combs extend substantially perpendicularly to the wall of the body in order to guide the rods of the cluster 2.

Displacement of the combs between the retracted and active positions is carried out by raising them.

The structure fastening the comb 5 to the body 4 of the tool will be described in detail below, the fastening structure of each comb being identical.

As mentioned above, the comb 5 is articulated at one of its ends on fittings, for example 11, arranged on the outer surface of the tool body 4 on either side of a slot 4a for passage of the comb 5, made in the tool body 4. The fittings are fastened to the tool body by any suitable means.

Moreover, the comb 5 comprises an operating arm 12 which extends beyond the articulation zone of the latter on the body and to which is attached the end of an elastic member 13 consisting, for example, of a spring for stressing comb 5 into the active position. The other end of the elastic member is fastened to an attachment lug 14, itself fastened to the outer surface of the body 4. It will thus be appreciated that elastic member 13 tends to stress comb 5 from its retracted position, shown in FIG. 1, towards its active position, shown in FIG. 2, in which the spring 13 has been compressed, thus causing the raising of the comb.

The handling tool according to the invention also comprises means for retracting the combs counter to the stress of the elastic means, to allow the handling member and the gripping head to pass into the tool body.

These retraction means comprise a sleeve 15 having, at one of its ends, guide and drive means 16 designed to cooperate with the gripping head 1 and/or the handling member 3 and with runways 17 and 18 formed by rails and provided opposite one another in the body 4, for its guidance during its displacement in the tool body, as will be described in more detail hereinbelow.

A counterweight 21 can also be provided under the drive and guide means 16 around the handling member 3 in order to ensure correct displacement of the retraction means.

At its other end, the sleeve has four stop surfaces, for example 19 and 20, at 90° relative to one another and designed to cooperate with the corresponding combs in order to displace them and/or maintain them in the retracted position shown in FIG. 1.

As can be seen more particularly in FIGS. 1 and 3, the means 16 for guiding the retraction sleeve of the combs advantageously comprise a supporting ring 22 which is arranged around the handling member 3 and on which are mounted freely rotatably mutually opposed rollers 23 and 24 designed to cooperate with the runways 17 and 18 integral with the body.

At least one of these rollers, for example the roller 23, is carried by one of the ends of a yoke-shaped supporting structure 25 (FIG. 3) radially displaceable in a receptacle 22a of the supporting ring 22 counter to the stress of elastic means 26, in order to follow a path on two levels defined by two portions 18a, 18b of the runway 18 (FIG. 1). These runway portions are parallel to the axis of the tool body, but are arranged at different radial distances from this axis, the portion 18a being the further from the axis, and are connected by means of a ramp-shaped runway portion 18c. This supporting structure 25 has, at its other end, a stud 27 extending in a recess 22b of the supporting ring 22, in order to attach these guide and drive means to the handling member 3.

The tool body also comprises stop means delimiting an active stable position of the comb retraction means.

It will be appreciated that, starting from the active position of the retraction means shown in FIG. 1, these means are in the low position for maintaining the combs in the retracted position along the wall of the body.

In this position, the lower parts of at least some of the stop surfaces 19 and 20 of the sleeve of the retraction means, also forming leading edges, bear on a stop ring 28 fixed to the tool body, in order to delimit the active stable position mentioned above.

During operation, i.e., during the raising of the handling member 3, the latter is displaced slidably in the tool body 4, the counterweight 21 and the supporting ring 22 causing the gripping head 1 and the cluster of rods attached to the latter to rise. When the gripping head 1, and more particularly its upper part, comes to bear against the counterweight 21, the continuation of the displacement of the handling member 3 causes the retraction means 15 to rise in the body 4. During this rise, the roller 23 passes from the first runway portion 18a to the second runway portion 18b, in such a way that the supporting structure 25 of this roller 23 is displaced radially towards the handling member 3, so that the stud 27 of the latter engages into a corresponding recess 3a of the handling member 3, in order to attach the retraction means as a whole to this handling member.

The handling member and the stud thus ensure the displacement of the retraction means as a whole in the body. During the raising of the handling member 3 and of the gripping head 1 in the body of the tool, the retraction sleeve 15 then continues to rise and releases the combs in proportion to this, so that these are displaced towards their active position shown in FIG. 2.

In fact, the leading edges of the retraction means, delimited by the lower parts of the stop surfaces 19 and 20, at 90° relative to one another, of the retraction sleeve, are offset axially so as to bring about a displacement, in this case successive release of the combs, in order to prevent any disturbances of the displacements of these and more particularly of the combs arranged at 90° relative to one another.

It will also be noted that these leading edges of the stop surfaces can be equipped with contact rollers, for example 29, these rollers facilitating the relative displacement of the stop surfaces in relation to the combs.

When the combs are in the active position shown in FIG. 2, they make it possible to maintain the relative position of the rods of consumable poison during the continuation of the rise of the cluster in the body.

The cluster is subsequently displaced towards another specific location by means of the platform in order to allow it to be installed in a new location. Once in position, the handling member 3 descends in the body, thereby bringing about a descent of the retraction means 15.

Because, during the first phase of descent of the handling member 3, the roller 23 of the guide and drive means 16 of the retraction means 15 cooperates with the second runway portion 18b, the attachment stud 27 is still engaged in the corresponding hole 3a of the handling member 3, and therefore the retraction means as a whole follow the descending movement of this handling member.

The rollers, for example 29, at the end of the stop surfaces of these retraction means, then cause successive displacements of the combs counter to the force exerted by the elastic means 13 from their active position, shown in FIG. 2, in which these combs extend approximately perpendicularly to the wall of the body, towards a retracted position along the wall of the body, shown in FIG. 1, as a result of the lowering of these combs.

The continuation of the descent of the handling member thus brings about the retraction of the combs uniformly until the roller 23 passes from the second runway portion 18b nearer the axis of the handling member onto the first runway portion 18a further from this axis.

The supporting structure 25 of this roller and therefore the guide and drive means 16 of the retraction means are disconnected from the handling member 3. The retraction means continue their descent in the body as a result of the presence of the counterweight 21, up to the moment when the rollers, for example 29, at the end of these come into contact against the stop ring 28 of the body delimiting the stable retraction position of the combs.

The handling member 3 and the gripping head 1 then continue their descent alone, in order to engage the cluster of rods of consumable poison completely in their new location.

The rest of the operations take place in a manner known per se as a result of a detachment of the gripping head from the cluster, and this head is then ready for handling a new cluster.

We claim:

1. Tool for handling a cluster of rods of consumable poison, said tool comprising a head for gripping the cluster, connected to the end of a handling member displaceable slidably in a tool body between an active position in which the head and at least part of the member project from the body, and a retracted position in which the gripping head, the handling member and at least part of the cluster extend within the body, and combs for guiding the rods, provided at the corresponding end of the body and displaceable by raising between a retracted position in which said combs extend substantially along the wall of the body, and an active position in which said combs extend substantially perpendicularly to said wall, in order to guide the rods, wherein said tool comprises elastic means for stressing said combs into active position and means for retracting said combs counter to the stress of said elastic means, displaceable between an active position of retraction of said combs and a retracted position of release of said combs by said gripping head and/or said handling member during displacement between their active position and their position retracted within said body.

2. Handling tool according to claim 1, wherein said elastic means are connected at one end to an arm for operating said combs and at another end to said body.

3. Handling tool according to claim 1, wherein said retraction means comprise a sleeve having, at a first end of said sleeve, drive and guide means cooperating with said gripping head and/or said handling member and complementary guide means integral with said body during the displacement of said gripping head and/or handling member in said body and, at a second end of said sleeve, stop surfaces designed to cooperate with said combs in order to displace said combs towards their retracted position.

4. Handling tool according to claim 3, in which said combs are arranged at 90° relative to one another on said tool body, and in which said sleeve has stop surfaces at 90° relative to one another with leading edges which are offset axially so as to bring about successive displacements of said combs at 90°.

5. Handling tool according to claim 4, comprising contact rollers at each end of said stop surfaces in order to facilitate relative displacement of said stop surfaces in relation to said combs.

6. Handling tool according to claim 3, wherein said drive and guide means comprise a supporting ring carrying rollers cooperating with guide runways of said body.

7. Handling tool according to claim 6, wherein one of said rollers is carried by a supporting structure radially displaceable in relation to said handling member in said supporting ring, in order to follow a guide runway on two levels, between a retracted position and an active attachment position, and wherein an attachment stud of the supporting structure engages into a recess of said handling member in order to attach said retraction means to said handling member.

8. Handling tool according to any one of claims 1 to 7, wherein said retraction means comprise a counterweight.

9. Handling tool according to any one of claims 1 to 7, wherein said tool body comprises a ring on which bear the ends of said stop surfaces of said retraction means in active position.

* * * * *